(No Model.) 3 Sheets—Sheet 1.

H. C. GRAVES.
APPLE AND OSAGE SEEDER.

No. 461,976. Patented Oct. 27, 1891.

WITNESSES
Lee R. Hudgens
Robert J. Dickson

INVENTOR
Henry C. Graves
per C. D. Hudgens
ATTORNEY (No Model.)  3 Sheets—Sheet 2.
H. C. GRAVES.
APPLE AND OSAGE SEEDER.
No. 461,976.  Patented Oct. 27, 1891.
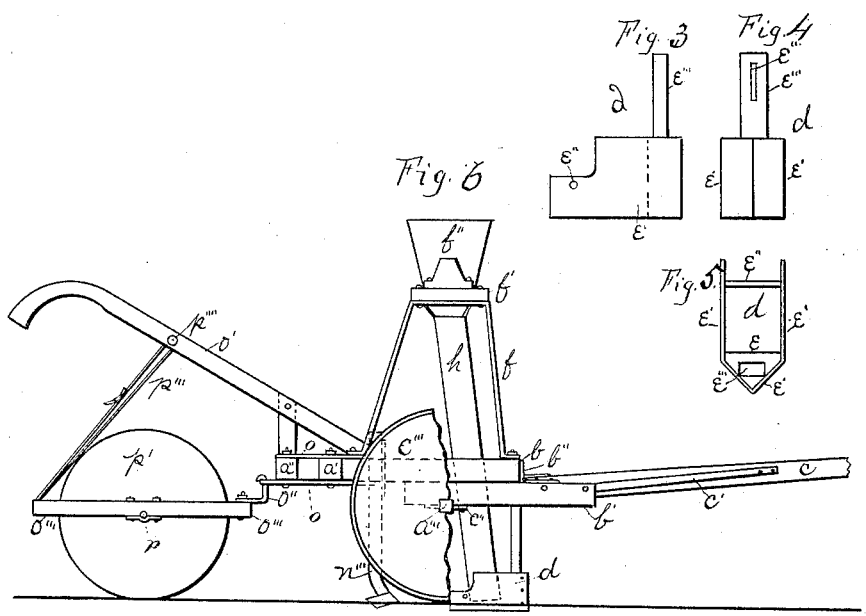
WITNESSES
Lee R. Hudgens
Robert J. Dickson
INVENTOR
Henry C. Graves
per. C. D. Hudgens
ATTORNEY.

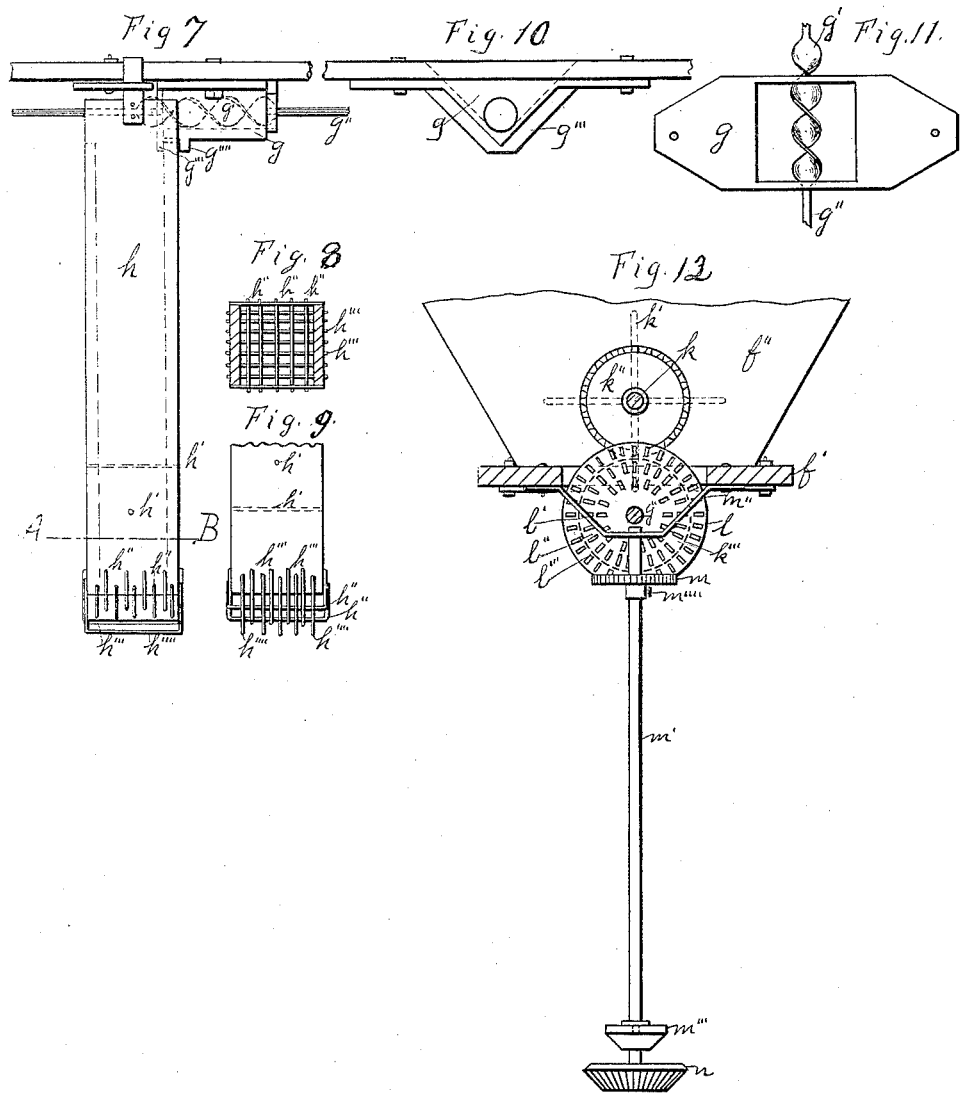

UNITED STATES PATENT OFFICE.

HENRY C. GRAVES, OF SANDWICH, ILLINOIS.

APPLE AND OSAGE SEEDER.

SPECIFICATION forming part of Letters Patent No. 461,976, dated October 27, 1891.

Application filed February 12, 1887. Serial No. 227,457. (No model.)

*To all whom it may concern:*

Be it known that I, HENRY C. GRAVES, a citizen of the United States, residing at Sandwich, in the county of De Kalb and State of Illinois, have invented a new and useful Apple and Osage Seeder, of which the following is a description.

The object of my invention is to provide a machine for sowing wet apple and osage seed; and it consists of a rectangular frame-work mounted upon two small wheels, to which frame-work are attached plows for opening the furrows and plows for filling the furrows after the seed has been dropped through tubes which extend upward from the plows to the seed-boxes, which are supported upon the main frame-work by legs. Through the seed-boxes two shafts extend, one above the other, which are operated from the axle of the main frame below by bevel-gears and a vertical shaft. The uppermost of the two shafts through the seed-boxes is provided with stirring-fingers above each of the four seed-openings for agitating the seed and working it down upon the augers or screw-feeders of the lower shaft, which passes through the bottom of the seed-boxes, which augers, four in number, force the seed out laterally into the upper ends of the four seed-tubes, which are provided at their lower extremities with a series of wire bails transversely arranged for separating the seed as it falls in bunches and distributing it uniformly in the furrows. Attached behind the main frame is a second frame, in which is arranged four wheels with concave tires, which follow each in the trail of the four plows, leaving the four rows, which are sown simultaneously, packed and covered. The functions of these wheels are both that of crushing the lumps and leaving the rows marked, so that they may be followed and cultivated before the plants break through the ground.

I attain the foregoing objects by means of the mechanism illustrated in the accompanying drawings, in which—

Figure 1:
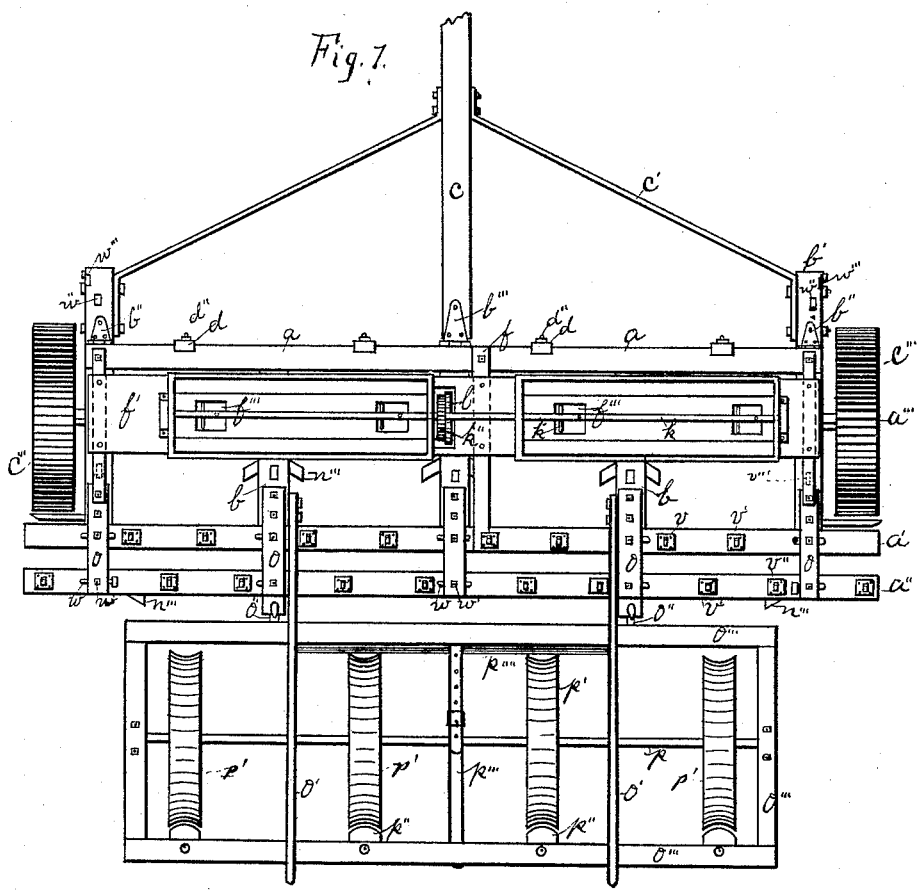
Figure 2:
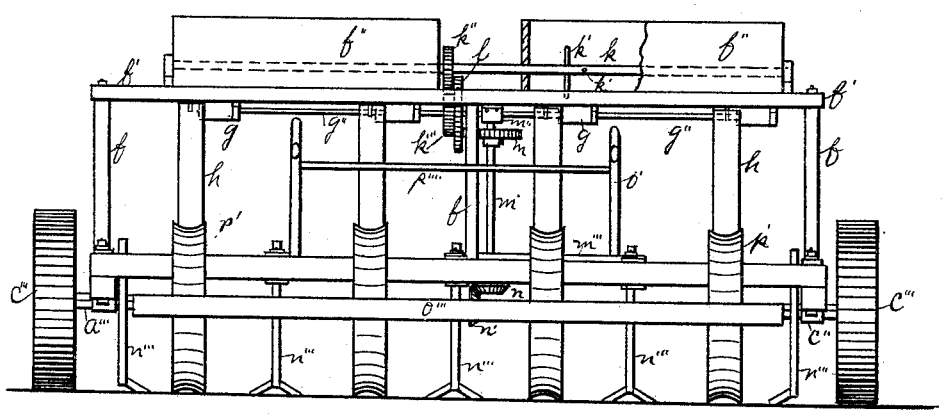

Figure 1 is a top view of the complete seeding-machine. Fig. 2 is a rear view of the same with a portion of one seed-box broken away. Figs. 3, 4, and 5 are side, front, and top views, respectively, of the plows. Fig. 6 is a side view of the seeding-machine. Fig. 7 is a detail view of the rear of the bottom of the seed-box and screw conveyer with seed-tube attached. Fig. 8 is a detail cross-section of the seed-tube on line A B of Fig. 7. Fig. 9 is a detail side view of the lower end of the seed-tubes. Fig. 10 is a detail end view of the bottom of the seed-box in which the screw conveyer operates. Fig. 11 is a detail top view of the same. Fig. 12 is a detail of the gear and vertical shaft which operates the two shafts of the seed-boxes.

Similar letters refer to similar parts throughout the several views.

The main rectangular frame is composed of the long bars $a$, $a'$, and $a''$, parallel with the axle $a'''$, and the five shorter cross-bars $b$. This frame rests upon and is secured to the bars $b'$ by the hinges $b''$ and by the hinge $b'''$ to the tongue $c$, which is secured to the bar $b'$ by the brace $c'$. The bar $b'$ rests upon the axle $a'''$, which is square throughout its length, except the bearings $c''$, and is supported upon the wheel $c'''$ at each end. To the front edge of the bar $a$ four plows $d$ are secured by bolts $d''$, which open furrows in which the seed is deposited, and are constructed, as shown in Figs. 4, 5, and 6, with the angular blocks $e$, which are covered with the iron fronts and sides $e'$, which are held parallel at the heels by the brace-bolts $e''$. From blocks $e'$ a standard $e'''$ extends upward, by means of which the plows $d$ may be set at any desirable height, as required, in making the seed-furrows of different depths. Above the axle $a'''$ and supported upon the main frame by means of the legs $f$ is the board $f'$, which constitutes the foundation of the seed-boxes $f''$. In the bottom of the seed-boxes $f''$ four rectangular holes $f'''$ are cut through the board $f'$, beneath which are secured by bolts the iron bottom $g$ of the seed-boxes $f''$, (shown in Figs. 8, 9, 11, and 12,) and through which operates the screw conveyer $g'$ of the shaft $g''$. One end of the bottom $g$ is provided with the flanges $g'''$ and lugs $g''''$ for holding the seed-tubes $h$ in position with the bottom $g$. From the bar $f'$ of the seed-boxes the seed-tubes $h$ are suspended in any suitable manner and project downward and slightly forward, the lower ends terminating in the open heels of the plows $d$. In the seed-tubes $h$ two wires $h'$ are transversely arranged for breaking lumps of the wet seed which adhere together on leaving the screw conveyers $g$ as they fall to the bottom of the tubes $h$, and are separated by sifting through the web-like work of the bails $h'' h''' h''''$. The bails $h''$ extend from front to rear across the lower open end of the tubes $h$, and are arranged alternately at two different heights, as shown in Fig. 8, and oscillate by the motion of the machine and the continuous striking of the corners of the axle $a'''$ against the seed-tubes $h$, which rest with their rear sides against said axle $a'''$. The bails $h'''$ and $h''''$ are arranged transversely to the bails $h''$ and oscillate in the same manner as the bails $h''$. Through the seed-boxes $f'''$ the shaft $k$ extends, having the stirring-fingers $k'$ set at right angles with each other and to the shaft $k$ over the openings $f'''$, for the purpose of stirring the seed and keeping it worked down upon the screw conveyer $g'$. The shaft $k$ is operated by the spur-wheel $k''$, which engages with the spur-wheel $k'''$ of the shaft $g''$, which shaft $g''$ is driven by the interchangeable face-gear $l$, having three sets of teeth $l'$ $l''$ $l'''$, (shown in Fig. 12,) which engage with the spur-wheel $m$ upon the vertical shaft $m'$, which is supported at its upper end by the box $m''$ and at its lower end by the bar $m'''$, which bar $m'''$ is secured in such a position on the bars $b$ that the bevel gear-wheel $n$ on the end of the shaft $m'''$ will engage with the bevel gear-wheel $n'$ upon the axle $a'''$. The spur-wheel $m$ is secured to the shaft $m'$ by the set-screw $m''''$, by which said wheel $m$ may be set in contact with the teeth $l'$ $l''$ $l'''$, as required in giving the conveyer $g'$ different rates of speed, thus regulating the quantity of seed sown. In the cross-bars $b$ the double plows $n'''$ are set for filling the seed-furrows and covering the seed, the outside two of which are single and are set in the bar $a''$. The bars $a'$ and $a''$ of the main frame are secured to the cross-bars $b$ by the iron straps $o$, which are bolted to the upper and lower sides of the bars $b$. To the second bars $b$ from the ends of the main frame handles $o'$ are attached, and to the lower pieces $o$ of the same bars $b$ are attached by means of the hooks $o''$, the frame $o'''$, with axle $p$, upon which four wheels $p'$ having concave tires are arranged, so as to follow the plows $t$. In the rear of the wheels $p'$ the scrapers $p''$ are bolted to the frame $o'''$ for keeping the wheels from becoming loaded with earth and preventing them from marking the rows. In passing around or turning at the ends of the rows the frame $o'''$, with wheels $p'$, are elevated from the ground by means of the strap $p'''$, which passes over the cross-bars $p''''$ of the handles $o'$.

Having described my invention, what I claim, and desire to secure by Letters Patent, is—

1. In a seeding-machine provided with a main frame supported upon wheels, as described, the combination of removable adjustable furrowing-plows $t$, seed-boxes $f'''$, and seed-tubes $h''$, having the screw conveyers $g'$ $g''$, and shaft $k$, provided with stirring-fingers, covering-plows $n''$, and a detachable frame mounted upon the wheels $p'$, having concave tires, all constructed and arranged to operate as shown and described.

2. In a seeding-machine mounted upon a main supporting-frame and wheels, as described, the combination of the removable adjustable furrowing-plows $t$, and covering-plows $n''$, seed-boxes $f''$, and seed-tubes $h$, having transverse wires therein, and transverse slots at the lower ends of same, screw conveyers $g'$ $g''$, shaft $k$, provided with stirring-fingers and operated by means of bevel-wheel $n$ on shaft $n'$, and a detachable frame $o'''$, having wheels $p'$, with concave tires, all constructed and arranged to operate as shown and described.

HENRY C. GRAVES.

Witnesses:
E. K. FREELAND,
E. RANDALL.